United States Patent [19]

Banach et al.

[11] Patent Number: 5,357,022

[45] Date of Patent: * Oct. 18, 1994

[54] METHOD FOR MAKING THERMOPLASTIC SILICONE-POLYPHENYLENE ETHER BLOCK COPOLYMERS AND BLOCK COPOLYMER BLENDS AND PRODUCTS OBTAINED THEREFROM

[75] Inventors: Timothy E. Banach, Glenville; Margaret L. Blohm, Schenectady, both of N.Y.; Kevin M. Snow, Mt. Vernon, Ind.

[73] Assignee: General Electric Company, Schenectady, N.Y.

[*] Notice: The portion of the term of this patent subsequent to Apr. 20, 2010 has been disclaimed.

[21] Appl. No.: 46,444

[22] Filed: Apr. 16, 1993

Related U.S. Application Data

[63] Continuation of Ser. No. 784,857, Oct. 30, 1991, abandoned.

[51] Int. Cl.$^5$ .............................................. C08G 77/46
[52] U.S. Cl. .................................... 528/29; 528/25; 525/393; 525/394; 525/397; 525/92
[58] Field of Search ............... 528/29, 25; 525/393, 525/394, 397, 474, 92

[56] References Cited

U.S. PATENT DOCUMENTS

| | | | |
|---|---|---|---|
| 3,522,326 | 7/1970 | Bostick et al. | 525/393 |
| 3,539,657 | 11/1970 | Noshay et al. | 525/474 |
| 3,639,655 | 11/1970 | Strachan et al. | 525/474 |
| 3,668,273 | 6/1972 | Krantz | 525/393 |
| 4,814,392 | 3/1989 | Shea et al. | 525/391 |
| 4,871,816 | 10/1989 | Percec et al. | 525/393 |

FOREIGN PATENT DOCUMENTS

| | | |
|---|---|---|
| 0073067 | 8/1982 | European Pat. Off. . |
| 0240095 | 1/1987 | European Pat. Off. . |
| 0433746 | 12/1990 | European Pat. Off. . |
| 2033608 | 7/1970 | Fed. Rep. of Germany . |
| 61-252214 | 11/1986 | Japan . |

*Primary Examiner*—Ralph H. Dean
*Attorney, Agent, or Firm*—William A. Teoli; William H. Pittman

[57] ABSTRACT

An oxidative coupling method is provided using a diorganophenol such as 2,6-xylenol and a silicone macromer having terminal phenol groups such as the hydrosilylation reaction product of eugenol. Thermoplastic polymeric products such as silicone-polyphenylene ether block copolymers, which can be flame retardant, as well as blends thereof with thermoplastic polymers, such as polyphenylene ether, also are provided.

6 Claims, No Drawings

METHOD FOR MAKING THERMOPLASTIC SILICONE-POLYPHENYLENE ETHER BLOCK COPOLYMERS AND BLOCK COPOLYMER BLENDS AND PRODUCTS OBTAINED THEREFROM

This application is a continuation, of application Ser. No. 07/784,857, filed Oct. 10, 1991, now abandoned.

BACKGROUND OF THE INVENTION

The present invention is directed to a method for making thermoplastic polymeric products in the form of silicone-polyphenylene ether block copolymers and to thermoplastic blends of such block copolymers with polyphenylene ether. More particularly, the present invention relates to a method of oxidatively coupling monohydric phenol to polydiorganosiloxane having terminal monohydric phenol groups and to flame retardant products obtained therefrom.

Prior to the present invention, organopolysiloxane-polyphenylene ether block copolymers are shown by Kranz, U.S. Pat. No. 3,668,273, involving the reaction between hydroxy terminated polyphenylene ether segments and amine terminated polydiorganosiloxane segments. Another silicone-polyarylene ether block copolymer which can be made by effecting reaction between an amine terminated polydiorganosiloxane and anhydride functionalized-polyarylene ether is shown by Shea, et al, U.S. Pat. No. 4,814,392.

In copending application Ser. No. 07/455,122 filed Dec. 22, 1989, now abandoned, for Silicone Macromers and Thermoplastic Flame Retardant Silicone-Polyphenylene Ether Graft Copolymers Obtained Therefrom, phenol-siloxane macromers are shown. Some of these phenol-siloxane macromers are included within the formula,

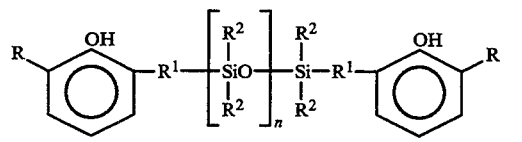
(1)

where R is selected from hydrogen, and the same or different radical selected from halogen, $C_{(1-8)}$ alkoxy, $C_{(1-8)}$ alkyl and $C_{(6-13)}$ aryl, $R^1$ is a $C_{(2-8)}$ divalent aliphatic radical, $R^2$ is selected from the same or different $C_{(1-13)}$ monovalent organic radicals, and n is an integer equal to 1 to 1000 inclusive. As taught in Ser. No. 07/455,122, now abandoned, if certain phenol-siloxane macromers having terminal phenol groups included within formula (1) where n is 10 to 30, are oxidatively coupled with a phenol, included within the formula,

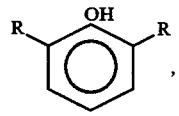
(2)

and there is used from 0.1 to 0.5 mol of macromer, per 100 moles of phenol, excessive cross-linking leading to gelation of the resulting block copolymer can be avoided.

It would be desirable therefore to be able to oxidatively couple phenol, such as a diorgano phenol to a siloxane macromer having terminal phenol groups over broad mol % ranges without having to be concerned with excessive cross-linking and gelation. The terms "gel" or "gelation" as used hereinafter means that the oxidative coupled reaction product is insoluble in organic solvents. Alternatively, the term "thermoplastic" means the ability to reversibly thermally mold or shape polymeric products at a temperature above their Tg and below their point of thermal decomposition produced by an oxidative coupling reaction in the form of silicone-polyphenylene ether block copolymer or a blend of such block copolymer and polyphenylene ether, referred to hereinafter as "composition".

SUMMARY OF THE INVENTION

The present invention is based on the discovery that a phenol of formula (2) can be oxidatively coupled to a phenol terminated polydiorganosiloxane having the formula,

$$[Y\tfrac{1}{2}Q,$$
(3)

referred to hereinafter as the "silicone macromer" where Q is a divalent polydiorganosiloxane group having the formula,

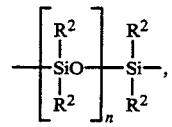

and Y is a monovalent phenol group selected from the class consisting of,

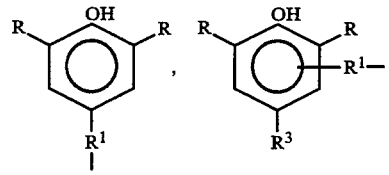

and

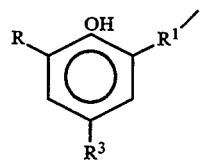

to produce thermoplastic reaction products in the form of silicone polyphenylene ether block copolymers, and compositions as previously defined, where R, $R^1$, $R^2$ and n are as previously defined, and $R^3$ is a $C_{(1-8)}$ alkyl radical. As shown hereinafter, some of these reaction products are flame retardant which means that these oxidatively coupled reaction products have satisfied UL94 V-O requirements for flammability, as shown by the "Flammability of Plastic Materials Bulletin" of Jan. 24, 1980. More particularly, a 5"×½"×1/16" test bar of silicone-polyphenylene ether copolymer or composition, is suspended vertically over a ¾" Bunsen Burner flame as provided in the aforementioned UL94 test. The test sample preferably exhibits a UL94 V-O rating which includes the following criteria:

A. Not have any specimens which burn with flaming combustion for more than 10 seconds after application of the test flame.
B. Not have a total flaming combustion time exceeding 50 seconds for 10 flame applications for each set of five specimens.
C. Not have any specimens which burn with flaming or glowing combustion up to the holding clamp.
D. Not have any specimens which drip flaming particles that ignite dry absorbent surgical cotton located 12 inches (305 mm) below the test specimen.
E. Not have any specimens with glowing combustion which persists for more than 30 seconds after the second removal of the test flame.

STATEMENT OF THE INVENTION

There is provided by the present invention, a method for making thermoplastic polymeric products comprising coupling a phenol of formula (2) with a phenol terminated polydiorganosiloxane of formula (3).

In a further aspect of the present invention, there is provided a method for making a thermoplastic flame retardant composition, which means an in situ blend of silicone-polyphenylene ether block copolymer and polyphenylene ether by oxidatively coupling a phenol of formula (2) to phenol terminated polydiorganosiloxane of formula (3), until an oxidatively coupled reaction product is obtained having an intrinsic viscosity (IV) dl/g of about 0.3 to 0.7 and preferably about 0.45, where the resulting flame retardant oxidatively coupled composition is a member selected from the class consisting of, (a) reaction product having from about 0.2 to about 2 wt % siloxane which results from the use of silicone macromer having an n value of about 10 to about 40, (b) reaction product having from about 0.2 to about 7 wt % siloxane which results from the use of silicone macromer having an n value of about 41 to about 70, and (c) reaction product having from about 0.2 to about 12 wt % siloxane which results from the use of silicone macromer having an n value of about 71 to about 500.

In an additional aspect of the present invention, there is provided a method for making flame retardant silicone-polyphenylene ether block copolymer comprising the product formed by oxidatively coupling a phenol of formula (2), to silicone macromer of formula (3), until an oxidatively coupled reaction product is obtained having an IV of about 0.3 to 0.7 and preferably about 0.45, where the silicone-polyphenylene ether block copolymer is a member selected from the class consisting of, (d) reaction product having greater than 2 to about 25 wt % siloxane which results from the use of silicone macromer having an n value of about 10 to about 40, (e) reaction product having greater than 12 to about 15 wt % siloxane which results from the use of silicone macromer having an n value of 71 to about 300.

Phenols which can be used to make the phenol terminated polydiorganosiloxanes of formula (3) are shown by the following formulas,

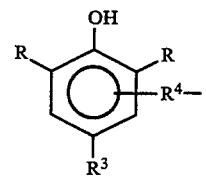

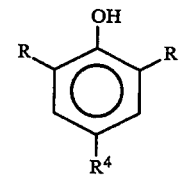

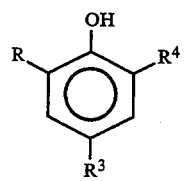

where R and $R^3$ are as previously defined and $R^4$ is a $C_{(2-8)}$ aliphatically unsaturated organic radical.

Radicals included within R of formulas 1,2,4,5, and 6 are as previously defined and are, for example, halogen, such as chloro or bromo, $C_{(1-8)}$ alkoxy such as methoxy, ethoxy, propoxy, t-butoxy; $C_{(1-8)}$ alkyl radicals, such as, methyl, ethyl, propyl and butyl; aryl radicals, such as, phenyl, tolyl, xylyl; haloaryl radicals, such as, chlorophenyl. Radicals included within $R^1$ are, for example, $C_{(2-8)}$ alkylene, such as dimethylene, trimethylene and butylene, or $C_{(2-8)}$ alkenyl, such as vinyl, propenyl and butenyl Radicals included within $R^2$ are the same or different hydrocarbon and halohydrocarbon radicals included within R. In addition, $R^2$ can be selected from trifluoropropyl, cyanoethyl and cyanopropyl. Radicals included within $R^3$ are, for example $C_{(1-8)}$ alkyl radicals included within R. Radicals included within $R^4$ are $C_{(2-8)}$ alkenyl radicals such as, vinyl, allyl and butenyl and alkynyl such as propynyl.

The phenol terminated polydiorganosiloxane of formula (2) can be made by effecting the platinum catalyzed addition between a siloxane hydride of the formula,

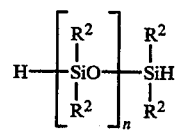

and a phenol shown by formulas (4), (5) or (6) where $R^2$ and n are as previously defined.

Monohydric phenols, which are included within formula (2) are, for example, 2,6-dimethylphenol, 2-methyl-6-phenylphenol, 2,6-diphenylphenol, and 2,6-di-t-butylphenol, and 2,6-dibromophenol.

Aliphatically unsaturated monohydric phenols, which are included within formulas 4, 5 and 6 are, for example, eugenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propargylphenol, 2-allyl-4,6-dimethylphenol, 2-allyl-4-bromo-6-methylphenol, 2-allyl-6-methoxy-4-methylphenol and 2-allyl-4,6-dimethylphenol.

The preferred oxidative coupling catalyst which can be used is an amine-basic cupric salt complex as shown by Hay, U.S. Pat. No. 3,306,874, in column 4, lines 38-61, and incorporated herein by reference. Effective oxidative coupling results also can be achieved with manganese and cobalt catalysts in addition to copper salts. Cuprous fluoride or cuprous bromide are the preferred copper salts. Typical of the primary and secondary amines which can be used in making the catalyst is shown in column 4, lines 62-75, and column 5, lines 1-55, of U.S. Pat. No. 3,306,874, which are incorporated herein by reference. However, dimethylbutylamine, dibutylamine and dibutylethylenediamine are examples of the preferred amines which can be used in forming the catalyst.

The flame retardant block copolymers and compositions of the present invention can be used as injection moldable high performance thermoplastics. In addition, the block copolymer of the present invention can satisfy UL94 V0 requirements when tested at 1/16", depending upon the moles of the silicone macromer of formula 3 and the mols of phenol of formula 2 used during the oxidative coupling reaction to form the block copolymer. The block copolymers and compositions which include in-situ formed copolymers and polyphenylene ether blends can be further melt or solution blended with thermoplastic polymers such as, polyphenylene ether, polycarbonates, polyesters, polyetherimides, polyolefins, such as polypropylene to impart flame retardant characteristics thereto.

The flame retardant block copolymers and compositions can be blended with any one of the aforementioned thermoplastic polymers to produce flame retardant blends thereof if 0.2 to 100 parts by weight of composition or copolymer is blended with 100 parts of thermoplastic polymer. In instances where the block copolymer or composition is not flame retardant, such as silicone materials having a wt% siloxane which exceeds the wt % siloxane as previously defined for the composition, for example >15% by weight, or the block copolymer, for example >25 wt % siloxane, flame retardant blends of such materials and thermoplastic polymer as previously defined can nevertheless be made. A flame retardant blend can be formed under melt or solution conditions using non-flame retardant composition or non-flame retardant copolymer by blending from 1 to 99 parts by weight of such non-flame retardant material with 99 to 1 part of thermoplastic polymer by weight.

Additional considerations include the silicone block length of the macromer which contributes to the overall weight % value of silicone in the block copolymer. Optimum flame retardant properties with respect to a V0 rating, for example, can be achieved with the block copolymer when there is employed a proportion of about 20 to 1000 mols of monohydric phenol, per mol of the silicone macromer during oxidative coupling within the previously described preferred ranges.

The silicone macromer of formula 3 can be used as a surfactant to facilitate the blending of organic and silicone materials under aqueous conditions. The silicone macromer also can be employed as a compatiblizer, or plasticizer for blends of silicone with other aromatic organic thermoplastic polymers.

In order that those skilled in the art can practice the present invention, the following examples are given by way of illustration and not by way of limitation. All parts are by weight unless otherwise indicated.

EXAMPLE 1

A silicone macromer reaction mixture consisting of 24.03 g ($6.538 \times 10^{-3}$ mol) of a siloxane hydride within the scope of formula (7) consisting of a polydimethylsiloxane having terminal dimethylhydrogensiloxy units and consisting of 46 condensed dimethylsiloxy units, 2.25 g ($1.387 \times 10^{-2}$ mol) of 2-allyl-4,6-dimethylphenol and 600 ppm (33.0 mg) of platinum on carbon (5 wt % platinum) catalyst was stirred at 105° C. for 1.25 hours. Upon cooling, the mixture was evacuated at 0.1 torr and reheated at 105° C. for 3 hours to remove low molecular weight species. Upon cooling there was obtained a 98.5% yield (24.63 g) of a clear, colorless oil. Based on method of preparation, there was obtained "Macromer A", a phenolsiloxane consisting of a polydimethylsiloxane having terminal 4,6-dimethyl-2-trimethylenephenol groups.

The above procedure was repeated except that in place of the 2-allyl-4,6-dimethylphenol, there was used 2.28 g of eugenol as the phenolic component. Based on method of preparation, there was obtained "Macromer B", a phenolsiloxane macromer consisting of a polydimethylsiloxane having terminal 2-methoxy-4-trimethylenephenol groups. The procedure was again repeated except that 2-allyl-6-methylphenol was used as the phenolic component. Based on method of preparation, there was obtained "Macromer C", a phenolsiloxane macromer consisting of a polydimethylsiloxane having terminal 2-methyl-6-trimethylenephenol groups. Macromers A, B and C were obtained at yields averaging from 90% to 99%. Silicone macromers A and B are included within the scope of formula (3) and silicone macromer C is within the scope of formula (1).

A polymerization reactor was charged with a solution of 2.5 g of 2,6-xylenol in 60 mL of toluene. There was added to the reactor, 1.23 mL of dimethylbutylamine, 0.25 mL of a 10% Adogen solution in toluene which is a cationic surfactant from Ashland Chemical company, 0.32 mL of dibutylamine, 0.125 mL of dibutylethylenediamine and 0.14 mL of copper bromide catalyst solution. While the reactor was agitated, oxygen was bubbled through the reaction mixture at 0.5 standard cubic feet per hour. After 2 minutes, a slow addition of a solution of 22.5 g of 2,6-xylenol and 14.6 g ($5.68 \times 10^3$ mol) of Macromer B in 70 mL of toluene was initiated. The addition was complete after 20 minutes; the reaction mixture was maintained at a temperature of 30°-40° C. After 48 minutes, the reaction was quenched by the addition of 5 mL of glacial acetic acid. The product precipitated from solution upon the addition of 3 volumes of absolute methanol; the mixture was slurried for 15 minutes. The product in the form of a powder was collected on a glass frit and washed repeatedly with 0.3 L portions of methanol. The product was dried in a 60° C. vacuum oven for 14 hours. There was obtained a yield of 34.5 g of a yellow powder. Based on the method of preparation an 87.0% yield of silicone-polyphenylene ether block copolymer was obtained. The identity of the product was further confirmed by $^1H$, $^{29}Si$ and $^{13}C$ NMR, IR, GPC, IV and elemental analyses.

The above oxidative coupling procedure was repeated with Macromer A. Based on the method of preparation, silicone-polyphenylene ether block copolymer was obtained in 90-95% yield. The identity of the product was further confirmed by the same analytical techniques as above. When the above procedure was repeated with 12.87 g ($5.06 \times 10^{-3}$ mol) of Macromer C bearing terminal 2-methyl-6-trimethylenephenol groups, the reaction mixture gelled in the reactor and the polymerization could not be completed.

These results show that oxidative coupling of macromer having terminal phenol groups within the scope of the invention, as shown by formula (3), formed useful silicone-polyphenylene ether copolymer even though 1 mole of macromer per 40 moles of xylenol were reacted. On the other hand, gelation occurred when using Macromer C having terminal phenol groups as shown within formula (1), where the position para to the OH on the ring is unsubstituted, although the same mole ratio of macromer to xylenol was used to make ungelled copolymers from Macromers A and B.

EXAMPLE 2

Following the procedure of example 1, additional macromers were prepared having the same terminal groups as Macromers A and B, but siloxane hydrides were used having block lengths of 14, 32, 35, 47 and 100 dimethylsiloxy units respectively. These macromers were converted to silicone polyphenylene ether block copolymers by the oxidative coupling procedure of example 1, to provide block copolymers having 1.5% to 30% by weight polydimethylsiloxane based on the use of different levels of 2,6-xylenol. The block copolymers were compression molded into 1/16" bars and evaluated for UL-94 flame retardance. The following results were obtained where Wt % Si in copolymers means Wt % dimethylsiloxane in silicone-polyphenylene ether block copolymer, and MACROMER shows the macromer used and silicone block length:

TABLE 2

| | UL-94 RESULTS | | | |
|---|---|---|---|---|
| | Wt % Si | UL-94* | | |
| MACROMER | COPOLYMER | FOT1 | FOT2 | RATING |
| B(10) | 10 | 1.2 | 1.0 | V-O |
| A(14) | 3.9 | 1.4 | 0.82 | V-O |
| A(14) | 1.6 | 2.0 | 1.28 | V-O |
| A(35) | 1.5 | 1.9 | 3.2 | V-O |
| B(32) | 1.5 | 1.7 | 1.6 | V-O |
| B(32) | 12 | 3.1 | 4.9 | V-O |
| B(47) | 1.5 | 3.1 | 4.9 | V-O |
| B(47) | 13 | 7.0 | 12.3 | V-1 |
| B(47) | 20 | 10.6 | 9.1 | V-1 |
| B(47) | 30 | 20.7 | 7.5 | HB** |
| A(100) | 1.5 | 2.5 | 1.7 | V-O |
| B(100) | 11.1 | 2.6 | 5.0 | V-O |
| B(100) | 14 | 2.0 | 5.6 | V-O |

*Flame out times (FOT) are average of five 1/16th inch bars.
**HB means the product failed the UL-94 test The above results show that silicone polyphenylene ether copolymers having flame retardant properties are dependent on both the block length of condensed dimethylsiloxane units in the macromer and wt % of dimethylsiloxane in the copolymer. The preferred wt % range of dimethylsiloxane can vary depending upon the block length of condensed dimethylsiloxane units in the macromer. Flame retardancy appears to be independent of the terminal phenol groups A or B. It was further found that contrary to the results shown in copending application Ser. No. 07/455,122, thermoplastic copolymers could be made using an oxidative coupling reaction mixture having 1 mol of macromer A or B, per $\leq 200$ moles of 2,6-xylenol.

EXAMPLE 3

The polymerization reactor was charged with a solution of 2.5 g of 2,6-xylenol in 60 mL of toluene. There was added to the reactor the same catalyst solution as described above. While the reactor was agitated, oxygen was bubbled through the reaction mixture at 0.5 standard cubic feet per hour. After 2 minutes, a slow addition of a solution of 22.5 g of 2,6-xylenol and 1.21 g ($4.83 \times 10^{-4}$ mol) of Macromer B having 46 condensed dimethylsiloxy groups in 70 mL of toluene was initiated. The polymerization was performed until the product had an IV of 0.45 dl/g and the reaction product isolated as described above. The product was dried in a 60° C. vacuum oven for 14 hours. There was obtained a yield of 24.75 g of a yellow powder. Based on the method of preparation, a 94.4% yield of a thermoplastic composition was obtained consisting of an in situ blend of silicone-polyphenylene ether block copolymer and polyphenylene ether and having less than about 2% by weight of polydimethylsiloxane. Additional thermoplastic compositions were prepared following the same procedure using Macromer B having a block length of about 41–70 having less than about 7% by weight of polydimethylsiloxane and a block length of 71–100 having less than about 12% by weight of polydimethylsiloxane. The identity of the products were further confirmed by the same analytical techniques as above. The various blends were found to satisfy UL-94 requirements.

EXAMPLE 4

Several silicone-polyphenylene ether block copolymers were prepared following the procedure of example 2. The block copolymers were physically blended under melt conditions with polyphenylene ether having an intrinsic viscosity of about 0.45 in chloroform utilizing from 0.2 to 50 parts by weight of block copolymer, per 100 parts of polyphenylene ether. The resulting blends were found to be flame retardant.

EXAMPLE 5

Several blends were made by mixing polyphenylene ether having an IV of about 0.45, with several flame retardant compositions of example 3 by dissolving the respective blend ingredients in 300 ml of toluene. There was then added three times the volume of methanol to each blend mixture. Products precipitated which were collected by filtration and dried in a 60° C. vacuum oven for 14 hours. There were obtained transparent films when the products were compression molded. The films were found to be flame retardant as shown in the following table, where "Mac" shows the macromer used and silicone block length and "Wt % Silox" is Wt percent polydimethylsiloxane:

| Copolymer | Blend | | | | |
|---|---|---|---|---|---|
| Mac | Wt % Silox | Wt % Copolymer | Wt % Polyether | Wt % Silox | UL-94 |
| A100 | 1.5 | 13 | 87 | 0.2 | V-O |
| A50 | 1.5 | 13 | 87 | 0.2 | V-O |
| A15 | 1.5 | 13 | 87 | 0.2 | V-O |
| B50 | 7.5 | 50 | 50 | 3.8 | V-1 |
| B50 | 7.5 | 13 | 87 | 2.5 | V-O |

| Copolymer | Blend | | | | |
| --- | --- | --- | --- | --- | --- |
| Mac | Wt % Silox | Wt % Copolymer | Wt % Polyether | Wt % Silox | UL-94 |
| B50 | 7.5 | 20 | 80 | 1.5 | V-O |
| B100 | 15 | 33 | 67 | 5.0 | V-O |

Although the above examples are directed to only a few of the very many variables which can be used in the practice of the method of the present invention to produce thermoplastic polymeric products of polyphenylene ether and silicone-polyphenylene ether block copolymers, a much broader variety of blends and silicone-polyphenylene ether block copolymers can be made as shown in the description preceding these examples.

What is claimed is:

1. A flame retardant silicone-polyphenylene ether block copolymer resulting from the oxidative coupling of 2,6-xylenol and a polydiorganosiloxane having terminal 2-methoxy-4-trimethylenephenol groups.

2. A method for making a flame retardant thermoplastic silicone polyphenylene ether block copolymer comprising oxidatively coupling a phenol of the formula, and a silicone macromer of the formula,

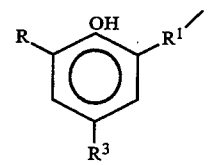

and a silicone macromer of the formula,

where R is a member selected from the group consisting of hydrogen, halogen, $C_{(1-8)}$ alkoxy, $C_{(1-8)}$ alkyl, and $C_{(6-13)}$ aryl, and mixtures thereof, Q is a divalent polydiorganosiloxane group having the formula,

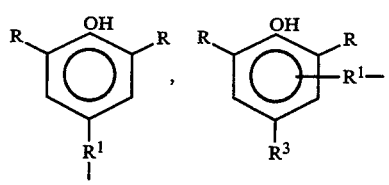

and

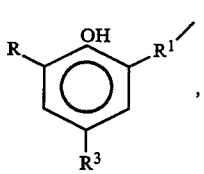

Y is a monovalent phenol group selected from the group consisting of,

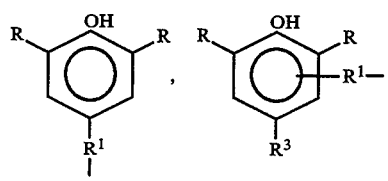

and

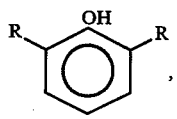

$R^1$ is a $C_{(2-8)}$ divalent aliphatic radical, $R^2$ is selected from the same or different $C_{(1-13)}$ monovalent organic radicals, $R^3$ is a $C_{(1-8)}$ alkyl radical, where the resulting oxidatively coupled reaction product has an intrinsic viscosity dl/g of about 0.3 to 0.7 and is a member selected from the group consisting of, (d) reaction product having greater than 2 to about 25 wt % siloxane which results from the use of silicone macromer having an n value of about 10 to about 40, (e) reaction product having greater than 12 to about 15% siloxane which results from the use of silicone macromer having an n value of 71 to about 300.

3. A method in accordance with claim 2, where the phenol is 2,6-xylenol.

4. A method in accordance with claim 2 where the phenol terminated polydiorganosiloxane is a phenol terminated polydimethylsiloxane.

5. A flame retardant silicone-polyphenylene ether block copolymer made in accordance with the method of claim 1.

6. A flame retardant composition comprising from 0.1 to 100 parts by weight of the silicone-polyphenylene ether block copolymer of claim 5, per 100 parts by weight of a thermoplastic polymer selected from the group consisting of polyphenylene ether, polycarbonate, polyester, polyetherimide and polyolefin.

* * * * *

UNITED STATES PATENT AND TRADEMARK OFFICE
CERTIFICATE OF CORRECTION

PATENT NO. : 5,357,022

DATED : October 18, 1994

INVENTOR(S) : Timothy E. Banach, Margaret L. Blohm, Kevin M. Snow

It is certified that error appears in the above-indentified patent and that said Letters Patent is hereby corrected as shown below:

Column 10, line 57, change "1" to --2--.

Signed and Sealed this

Twenty-seventh Day of December, 1994

Attest:

BRUCE LEHMAN

Attesting Officer                Commissioner of Patents and Trademarks